June 7, 1927.                                                    1,631,317
W. H. FOX
BASEBALL CENTER AND PROCESS OF PRODUCING THE SAME
Filed Feb. 11, 1927
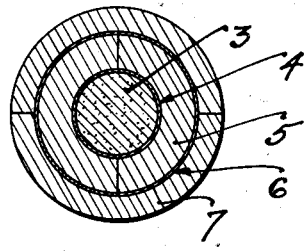
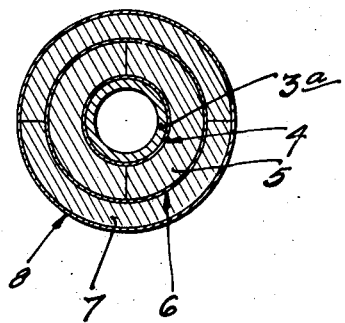
Inventor
William H. Fox
By his Attorneys Patented June 7, 1927.

1,631,317

UNITED STATES PATENT OFFICE.

WILLIAM H. FOX, OF MINNEAPOLIS, MINNESOTA.

BASEBALL CENTER AND PROCESS OF PRODUCING THE SAME.

Application filed February 11, 1927. Serial No. 167,478.

My present invention relates to baseballs, and particularly to that portion thereof known as baseball centers, and provides certain improvements therein whereby the ball is given the proper weight and resilience and will maintain its spherical form under rough and continued usage. Generally stated, the invention consists of the novel elements, combinations of elements and arrangement of parts hereinafter described and defined in the claims.

The invention also consists in an improved process of producing the said ball center.

In the accompanying drawings, which illustrate the invention, like characters indicate like parts throughout the several views.

Referring to the drawings:

Fig. 1 is a section taken centrally through the improved ball center; and

Fig. 2 is a similar view, illustrating a slightly modified construction.

Referring first to the construction illustrated in Fig. 1, the numeral 3 indicates a spherical center core of light resilient material, preferably cork. This core 3 is completely coated with a thin layer 4 of uncured rubber. Two hollow semi-spherical rubber sections 5 are placed immediately around and in contact with the uncured rubber coating 4, and then the applied sections 5 are completely covered with a thin layer of uncured rubber 6; next, two hollow rubber semi-spherical sections 7 are placed around and in contact with the uncured layer 6. The edges of the sections 5 are brought into close engagement and the edges of the sections 7 are brought into close engagement, but in different planes, preferably so that the joints between the sections 5 are at a right angle to the joints between the sections 7. The rubber sections 5 and 7 may be either of cured rubber or of partly cured rubber, that is, they are of rubber that is at least partly cured.

After the said elements have been assembled as shown in Fig. 1, they will be subjected to vulcanizing heat, which will vulcanize and cure the rubber layers 4 and 6, thereby causing the several elements composing the ball center to become, as it were, a substantially integral structure, in which the elements cannot be forced out of their true concentric relation. The vulcanization of the layer 4, of course, causes the semi-spherical sections 5 to firmly adhere to the center core 3, and the vulcanization of the layer 6 causes the semi-spherical sections 7 to be firmly united to the semi-spherical sections 5. When the parts are thus united with the joints between the semi-spherical sections 5—5 and 6—6 at an intersecting angle, the sections 5 will, by the surface contacts made by the vulcanized layers 4 and 6, be firmly held together and against radial displacement; and this makes unnecessary interposing of unvulcanized rubber washers or the like between the abutting edges of the said sections 5 and 6. The outer spherical sections 7 may be still further secured together by applying a layer 8 around the same, as shown in Fig. 2.

The structure illustrated in Fig. 2, except for the applied outer layer 8 and the specific form of core center 3ª, is identical with that illustrated in Fig. 1; but in this slightly modified structure, the center core 3ª, instead of being of cork, is a hollow rubber ball preferably of completely cured rubber.

The spherical sections 5 and 6, if of but partly cured rubber, when applied will, under the action of the heat required to vulcanize the layers 4 and 6, be completely cured in the finished ball center. It will, of course, be understood that the completion of the baseball may be carried out by any of the well known methods, wherein the outer portion of the ball is applied around the completed or vulcanized ball center.

In a ball center constructed as above described, all of the elastic elements thereof are equally distributed throughout the sphere and hence the ball will be given equal elasticity at all radial points, and the absorption quality of the ball center of the blow from a bat will be equal at all points. In practice I have found that the insertion at different radial points or in different radial planes of additional elastic elements such as flexible rubber will materially vary the elasticity and absorption qualities of the ball in the planes where said elements are applied.

What I claim is:

1. As a new article of manufacture, a ball center comprising a spherical center core, a thin spherical layer of rubber applied around said center core, a pair of inner semi-spherical rubber sections applied around and in contact with said spherical rubber layer, a thin outer rubber spherical rubber layer applied around said inner spherical sections, and a pair of semi-spherical outer rubber sections applied around and in contact with said outer spherical rubber layer, the said spherical rubber layers being vulcanized and connecting the contacting elements substantially as an integral structure.

2. The structure defined in claim 1 in which there is a third spherical layer of rubber applied and vulcanized around said outer spherical sections.

3. The process of making ball centers, which consists in forming a spherical center core, in placing a thin spherical layer of uncured rubber around said center core, in placing a pair of semi-spherical rubber sections around and in contact with the said uncured spherical layer, in placing an outer thin spherical layer of uncured rubber around said semi-spherical sections, in placing an outer pair of semi-spherical sections around and in contact with said outer spherical layer of uncured rubber, and in subjecting the assembled parts to heat to vulcanize said uncured rubber layers and thereby integrally unite the said elements.

4. The process described in claim 3, which consists further in applying a third spherical layer of uncured rubber around said outer spherical sections and subjecting the same to vulcanizing temperature.

5. As a new article of manufacture, a ball center comprising a spherical center core, semi-spherical rubber sections enclosing said center core, and spherical layers of rubber applied inside and outside of said semi-spherical rubber sections and uniting the same, the said rubber layers being vulcanized and permanently connecting said semi-spherical sections.

6. As a new article of manufacture, a ball center comprising a spherical center core, an inner pair of semi-spherical rubber sections enclosing said center core, an outer pair of semi-spherical rubber sections enclosing the first noted semi-spherical pair of rubber sections, and a spherical layer of rubber interposed between said two pairs of semi-spherical rubber sections and vulcanized thereto and connecting said inside and outside sections.

7. The process of making ball centers which consists in placing a pair of semi-spherical rubber sections around a center core, in placing an outer pair of semi-spherical rubber sections around said inner pair of semi-spherical rubber sections, in placing spherical layers of uncured rubber between said outer and inner semi-spherical rubber sections, and in subjecting the assembled parts to heat to thereby vulcanize said spherical rubber layer and cause the same to connect said inner and outer semi-spherical sections.

8. The process described in claim 7 which consists further in placing a spherical layer of uncured rubber around said outer spherical sections and subjecting the same to vulcanizing temperature.

In testimony whereof I affix my signature.

WILLIAM H. FOX.